July 2, 1940.    P. BARTHOLOMEW    2,206,316
DOUGH CUTTER
Filed March 13, 1939

INVENTOR.
PHILOMENA BARTHOLOMEW
BY M. Talbert Dick
ATTORNEY.

Patented July 2, 1940

2,206,316

UNITED STATES PATENT OFFICE 2,206,316

DOUGH CUTTER

Philomena Bartholomew, Des Moines, Iowa

Application March 13, 1939, Serial No. 261,548

3 Claims. (Cl. 30—302)

The principal object of my invention is to provide a manually operated cutting device for cutting a plurality of triangular pieces of dough from a sheet of dough for making dough scones or like prior to baking.

A further object of this invention is to provide a scone cutter that is of simple construction, light in weight, and easily kept in a sanitary condition.

A still further object of my invention is to provide a cutting apparatus for cutting a plurality of triangular pieces of dough from a sheet of dough in one operation that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

The cutting of triangular pieces of dough for the making of buttered scones or like is not new. The operation is usually performed with a knife and each triangular piece of dough, therefore must be separately cut and formed. Obviously, by such a procedure, the triangular pieces will not be uniform in dimensions and much effort is required and time lost in forming such triangular pieces of dough. I have overcome such objections by providing a cutter device that will cut and form a plurality of triangular pieces from dough in one operation with all of the triangular pieces of uniform dimensions.

Figure 1:
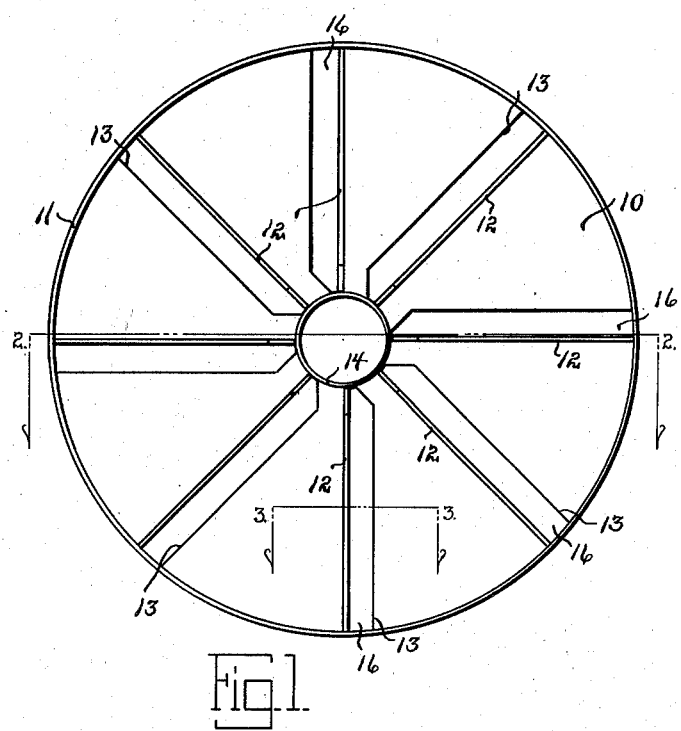
Fig. 1 is a bottom plan view of my device ready for use.
Figure 2:
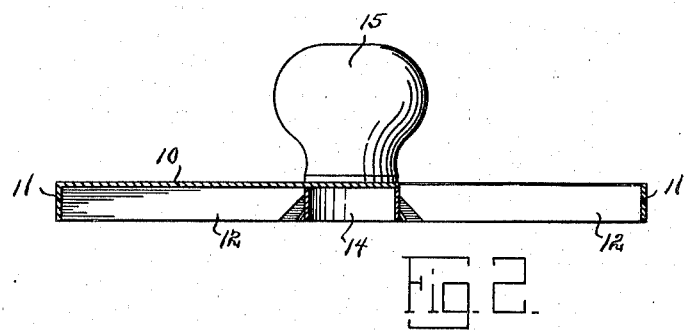
Fig. 2 is a cross sectional view of my cutter taken on line 2—2 of Fig. 1 and more fully illustrates its construction.
Figure 3:
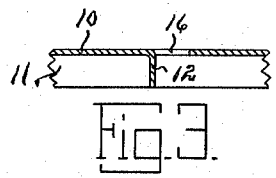
Fig. 3 is a sectional view of a portion of my device taken on line 3—3 of Fig. 1 and illustrates the manner of forming the radially extending cutting knives.

Referring to the drawing, I have used the numeral 10 to designate the base portion of my cutter which is in the form of an inverted cup member due to the presence of a downwardly extending circular peripheral wall 11. The numeral 12 designates a plurality of spaced apart radially arranged cutting walls or knives extending inwardly from the inner side of the wall 11. These radially arranged cutting walls or knives are formed by cutting a like number of slits 13 in the top of the base portion 10 and then bending a portion of the base 10 downwardly in each instance to form the cutting knives 12 as shown in Fig. 1. By this construction, the radially extending straight cutting knives 12 are formed from the top of the base 10, thereby requiring no additional material to fabricate the portions 12 of my cutter. These cutting members 12 have their lower cutting edges in the same plane as the lower edge of the outer circular wall 11 and obviously extending parallel with the lower plane of the wall 11. As the portions 12 are cut, formed and bent from the top of the base 10 to provide downwardly extending edges on the side of the base 10, each of these members 12 will extend downwardly at right angles to the plane of the upper portion of the base part 10 as shown in Fig. 2. The numeral 14 designates a circular wall extending downwardly from the under side of the dead center of the member 10. The circular wall 14 extends downwardly to terminate in the same plane as the bottom plane of the wall 11 and is engaged on its outer periphery by the inner end portions of each of the members 12. The lower marginal edge of this circular wall 14, the lower marginal edges of the members 12, and the lower marginal edge of the wall 11 provide the cutting surfaces of my device. By this arrangement, the inner ends of the members 12 terminate at the circular wall 14 which obviously is of a comparatively small diameter relative to the diameter of the wall 11 as shown in Fig. 1. If desired, the inner cutting edge of each of the members 12 may be blunted to extend inwardly and upwardly to the wall 14 as shown in Fig. 2. By such a construction, when my device is forced downwardly on a sheet of dough, the plurality of scones cut and formed will not be entirely severed from each other, but on the other hand will be slightly connected together at their inner ends. This makes possible the successful handling of a plurality of cut scones, but their holding connection together is very fragile and they may easily be broken from each other. If desired, however, the cutting edge of each of the members 12 may extend downwardly to the circular wall 14 and not be blunted such as shown in Fig. 2. By this alternate construction, the scones would be completely severed from each other. The numeral 15 designates a handle member secured on the dead center top of the device to facilitate its manual operation.

To use my device, it is merely necessary to force it downwardly on a sheet of dough and simultaneously a plurality of substantially triangular shaped sections will be cut from the dough. By lifting the device upwardly from the dough, the cut sections will be available for lifting, processing and baking. By the use of my device, it will be noted that there will be little waste of the dough that will have to be again mixed and rolled out. The only loss within the wall 11 will be that dough that falls within the small circular wall 14. As the members 12 are cut from the top portion of the member 10 and bent downwardly, an open space 16 will be present at each side of each of the members 12 in the top of the member 10. These openings are desirable as they permit the escape of air during the operation process and also facilitate the washing and cleaning of the device and keeping it in a sanitary condition. Furthermore, if any one or more of the cut triangular portions has a tendency to stick within the device when the device is lifted from a sheet of dough, it is merely necessary to force it downwardly by sticking any blunt object through the adjacent opening 12 above such section that is sticking.

From the foregoing it will readily be seen that I have providing a highly desirable cutting utensil.

Some changes may be made in the construction and arrangement of my improved dough cutter without departing from the real spirit and purpose of my invention, and it is my intention to cover by my claims any modified forms of structure or use of mechanical equivalents which may be reasonably included within their scope.

I claim:

1. In a device of the class described, an upper base portion, a continuous outer downwardly extending cutting wall, and a plurality of straight cutting walls extending downwardly from the under side of the upper base portion and so arranged relative to each other and to said outer cutting wall as to form a plurality of substantially triangular compartments; said straight cutting walls being cut, formed and bent from said upper base portion.

2. In a device of the class described, an upper base portion, a continuous circular downwardly extending cutting wall on the under side of said upper base portion, a second continuous downwardly extending cutting wall positioned inside said first mentioned cutting wall on the under side of said upper base portion and having a diameter substantially less than the diameter of said first mentioned cutting wall, and a plurality of spaced apart straight radially extending cutting walls cut, bent and formed from said upper base member extending between said first mentioned and said second mentioned cutting walls; said straight cutting walls each having their lower marginal edge extending upwardly and inwardly as it approaches said second mentioned circular cutting wall.

3. In a device of the class described, an upper base portion, a continuous circular downwardly extending cutting wall on the under side of said upper base portion, a second continuous downwardly extending cutting wall positioned inside said first mentioned cutting wall on the under side of said upper base portion and having a diameter substantially less than the diameter of said first mentioned cutting wall, and a plurality of spaced apart straight radially extending cutting walls extending between said first mentioned and said second mentioned cutting walls; said straight downwardly extending cutting walls being cut, formed and bent from said upper base portion.

PHILOMENA BARTHOLOMEW.